(12) United States Patent
Griffiths et al.

(10) Patent No.: US 10,386,809 B2
(45) Date of Patent: *Aug. 20, 2019

(54) REMOTE COMMAND LEARNING

(71) Applicant: Sonos, Inc, Santa Barbara, CA (US)

(72) Inventors: Neil Griffiths, Cambridge, MA (US);
Simon Jarvis, Cambridge, MA (US);
Hilmar Lehnert, Framingham, MA
(US); Aurelio Ramos, Cambridge, MA
(US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,458

(22) Filed: Apr. 23, 2018

(65) Prior Publication Data

US 2018/0239326 A1    Aug. 23, 2018

Related U.S. Application Data

(63) Continuation of application No. 13/653,082, filed on Oct. 16, 2012, now Pat. No. 9,952,576.

(51) Int. Cl.
*G05B 19/18* (2006.01)
*G05B 19/042* (2006.01)
(Continued)

(52) U.S. Cl.
CPC ......... *G05B 19/0426* (2013.01); *G05B 19/02* (2013.01); *G05B 19/04* (2013.01);
(Continued)

(58) Field of Classification Search
CPC ............ G08C 2201/20; G08C 2201/93; G08C 2201/42; G08C 2201/92; H04N 5/4403
(Continued)

(56) References Cited

U.S. PATENT DOCUMENTS 5,440,644 A   8/1995   Farinelli et al.
5,761,320 A   6/1998   Farinelli et al.
(Continued)

FOREIGN PATENT DOCUMENTS

EP   1389853 A1      2/2004
WO   200153994       7/2001
WO   2003093950 A2  11/2003

OTHER PUBLICATIONS

AudioTron Quick Start Guide, Version 1.0, Mar. 2001, 24 pages.
(Continued)

*Primary Examiner* — Munear T Akki
(74) *Attorney, Agent, or Firm* — McDonnell Boehnen Hulbert & Berghoff LLP

(57) ABSTRACT

Systems, methods, apparatus, and articles of manufacture to learn and share remote commands are disclosed. An example method to configure a playback device to be controlled by a remote control includes receiving by the playback device a first code for a first command from the remote control. The example method includes identifying by the playback device a second code for a second command based on the received first code. The example method includes receiving by the playback device the second code from the remote control. The example method includes executing the second command by the playback device.

20 Claims, 13 Drawing Sheets

(51) Int. Cl.

| | |
|---|---|
| *G06F 16/635* | (2019.01) |
| *G06F 16/438* | (2019.01) |
| *G05B 19/02* | (2006.01) |
| *G06F 3/16* | (2006.01) |
| *H04R 27/00* | (2006.01) |
| *G05B 19/04* | (2006.01) |

(52) U.S. Cl.
CPC .......... *G06F 3/165* (2013.01); *G06F 16/4387* (2019.01); *G06F 16/635* (2019.01); *H04R 27/00* (2013.01); *G05B 2219/23051* (2013.01); *G05B 2219/2615* (2013.01); *G05B 2219/2642* (2013.01); *H04R 2227/005* (2013.01)

(58) Field of Classification Search
USPC ...... 340/4.2, 4.3, 4.32, 4.33, 12.28; 341/176
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | Dilorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,136,709 | B2 | 11/2006 | Arling et al. |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,527,876 | B2 | 9/2013 | Wood et al. |
| 8,942,252 | B2 | 1/2015 | Balassanian et al. |
| 8,989,406 | B2 | 3/2015 | Wong et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0141987 | A1 | 7/2003 | Hayes |
| 2003/0157951 | A1 | 8/2003 | Hasty |
| 2003/0227407 | A1* | 12/2003 | Yuen ...................... G08C 19/28 341/176 |
| 2004/0024478 | A1 | 2/2004 | Hans et al. |
| 2004/0266419 | A1* | 12/2004 | Arling .................... G08C 17/00 455/420 |
| 2005/0216738 | A1 | 9/2005 | Kita et al. |
| 2006/0032357 | A1 | 2/2006 | Roovers et al. |
| 2006/0195902 | A1 | 8/2006 | King et al. |
| 2007/0057808 | A1 | 3/2007 | Knespel |
| 2007/0142944 | A1 | 6/2007 | Goldberg et al. |
| 2008/0107402 | A1 | 5/2008 | Angiolillo et al. |
| 2008/0201754 | A1 | 8/2008 | Arling et al. |
| 2008/0248764 | A1 | 10/2008 | Oh et al. |
| 2010/0232771 | A1 | 9/2010 | Prestenback et al. |
| 2010/0312817 | A1 | 12/2010 | Steakley |
| 2010/0331082 | A1 | 12/2010 | Kim et al. |
| 2011/0093697 | A1* | 4/2011 | Yuh .......................... G06F 8/65 713/153 |
| 2012/0017250 | A1 | 1/2012 | Tirasirikul et al. |
| 2012/0075082 | A1* | 3/2012 | Rothkopf ............... G08C 17/02 340/12.28 |
| 2012/0272277 | A1 | 10/2012 | Rahman |
| 2013/0070154 | A1* | 3/2013 | Ahn ................. H04N 21/42204 348/569 |
| 2013/0202131 | A1 | 8/2013 | Kemmochi et al. |
| 2013/0329896 | A1 | 12/2013 | Krishnaswamy et al. |
| 2014/0006265 | A1 | 1/2014 | Ye |
| 2014/0192986 | A1 | 7/2014 | Lee et al. |
| 2014/0219483 | A1 | 8/2014 | Hong |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Mar. 7, 2016, issued in connection with U.S. Appl. No. 13/653,082, filed Oct. 16, 2012, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Aug. 3, 2016, issued in connection with U.S. Appl. No. 13/653,082, filed Oct. 16, 2012, 9 pages.
Notice of Allowance dated Dec. 12, 2017, issued in connection with U.S. Appl. No. 13/653,082, filed Oct. 16, 2012, 9 pages.
Notice of Allowance dated Jan. 25, 2017, issued in connection with U.S. Appl. No. 13/653,082, filed Oct. 16, 2011, 6 pages.
Notice of Allowance dated Oct. 26, 2017, issued in connection with U.S. Appl. No. 15/594,803, filed May 15, 2017, 10 pages.
Notice of Allowance dated Feb. 27, 2017, issued in connection with U.S. Appl. No. 15/342,588, filed Nov. 3, 2016, 10 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

| Controller Type | Code | Command |
|---|---|---|
| Controller 500 | 1 | Volume Up |
| Controller 500 | 2 | Volume Down |
| Controller 500 | 3 | Mute |
| Controller 500 | 4 | Play |
| Controller 500 | 5 | Pause |
| Remote Control 3000 | 1234 | Volume Up |
| Remote Control 3000 | 1235 | Volume Down |
| Remote Control 3000 | 1236 | Mute |
| Remote Control 3000 | 1237 | Play |
| Remote Control 3000 | 1238 | Pause | ions to the arrangements and instrumentality shown in the drawings.

REMOTE COMMAND LEARNING

CROSS-REFERENCE TO RELATED APPLICATIONS

This application is a continuation of U.S. application Ser. No. 13/653,082, titled "Methods and Apparatus to Learn and Share Remote Commands," filed on Oct. 16, 2012, and currently pending. The entire contents of the Ser. No. 13/653,082 application are incorporated herein by reference.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
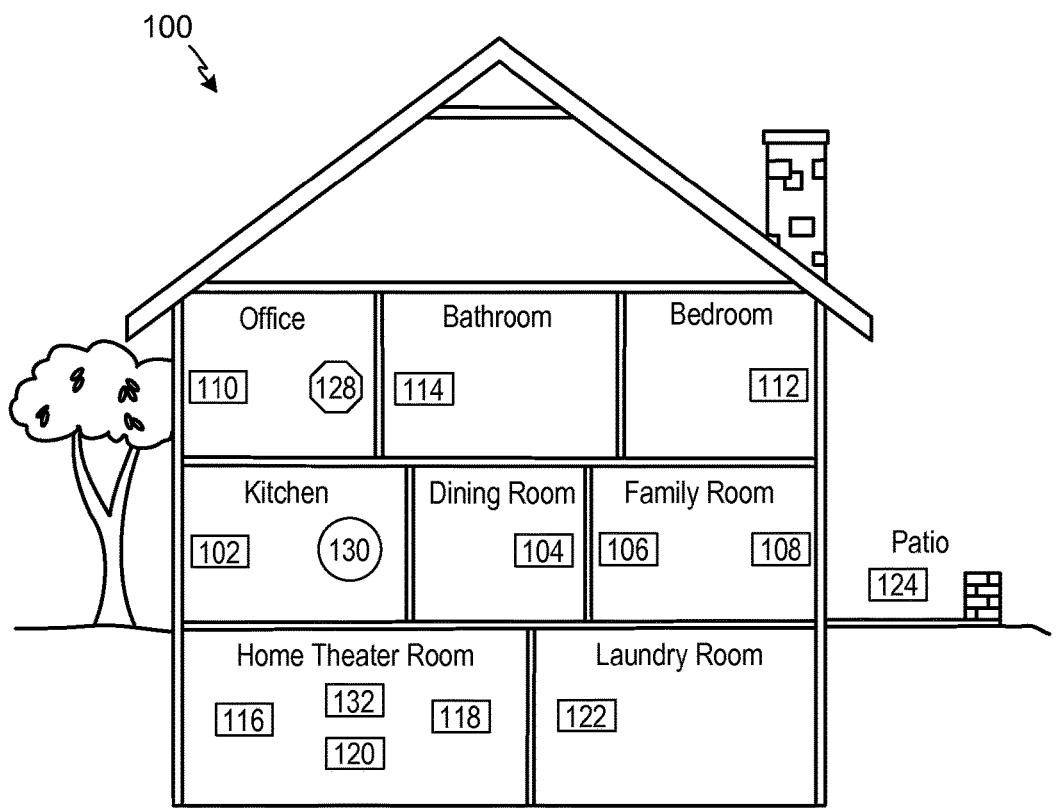
FIG. 1 shows an example configuration in which certain embodiments may be practiced.

In addition, the drawings are for the purpose of illustrating example embodiments, but it is understood that the present disclosure is not limited to the arrangements and instrumentality shown in the drawings.

DETAILED DESCRIPTION

I. Overview

An audio playback device may be used in a media presentation system to provide audio output for a display device. For example, the audio playback device may play audio content in conjunction with the display device. In an example, the audio playback device is a sound bar and the display device is a television. Many televisions include an infrared (IR) remote sensor to receive line-of-sight remote control signals to control the televisions. As the audio playback device may provide audio output for a television, the audio playback device may recognize the remote control signals used to control the television. Thus, in such an example, the audio playback device may be controlled by a remote control. A user may, for example, adjust the volume, mute the volume, start playback, pause playback, etc., using the remote control. In some examples, the playback device may be controlled using the remote control even when the display device is not being used (e.g., the television is powered off).

In some examples, the playback device may process commands from a variety of remote controls using a variety of code formats and/or encodings. In some examples, a remote control may be initially unknown to or undefined with respect to the playback device (e.g., the particular remote control is not associated with or sold with the playback device). In some examples, the playback device may learn remote control commands for the variety of remote controls so that the variety of remote controls may be used to control the playback device without requiring an extensive or exhaustive set-up process for the user. In such examples, a user may use a third-party remote to control the playback device (e.g., the third-party remote may be used as a universal remote). In some examples, a user may initially enter a single command on a remote control (e.g., the user may select or depress a volume up button on the remote) and the playback device recognizes the single command. In such examples, after recognizing the single command, the playback device obtains other commands associated with the remote (e.g., with the same code format, encoding, etc.) and stores the commands for later recognition. Thus, the playback device may learn all commands associated with the remote based on only a single button push by the user. Furthermore, the playback device itself can learn control commands associated with a variety of remote controls, rather than requiring the remote controls to learn control commands from other remote controls.

In some examples, commands recognized or learned by a playback device may be shared with other devices on the same local network. In such examples, a state variable may be used to store recognized or understood codes, and network-enabled devices may query the playback device for the value of the state variable.

In some examples, commands recognized at a playback device are shared with other playback devices via a shared resource, such as a cloud database. In such examples, a database of recognized or understood codes may be grown through a pool of playback devices. Such a method of command sharing increases the likelihood that a particular playback device will recognize a particular format or encoding used by a remote control.

An example method to configure a playback device to be controlled by a remote control includes receiving by the playback device a first code for a first command from the remote control. The example method includes identifying by the playback device a second code for a second command based on the received first code. The example method includes receiving by the playback device the second code from the remote control. The example method includes executing the second command by the playback device.

An example tangible computer-readable storage medium comprises instructions that, when executed, cause a computing device to receive by a playback device a first code for a first command from a remote control. The example instructions cause the computing device to identify by the playback device a second code for a second command based on the received first code. The example instructions cause the computing device to receive by the playback device the second code from the remote control. The example instructions cause the computing device to execute the second command by the playback device.

II. An Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. The system configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
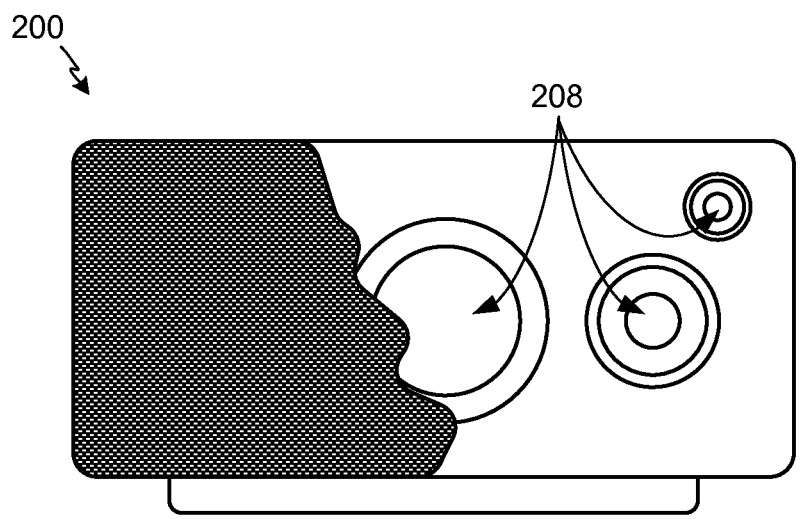
FIG. 2A shows an illustration of an example zone player having a built-in amplifier and transducers.
Figure 2B:
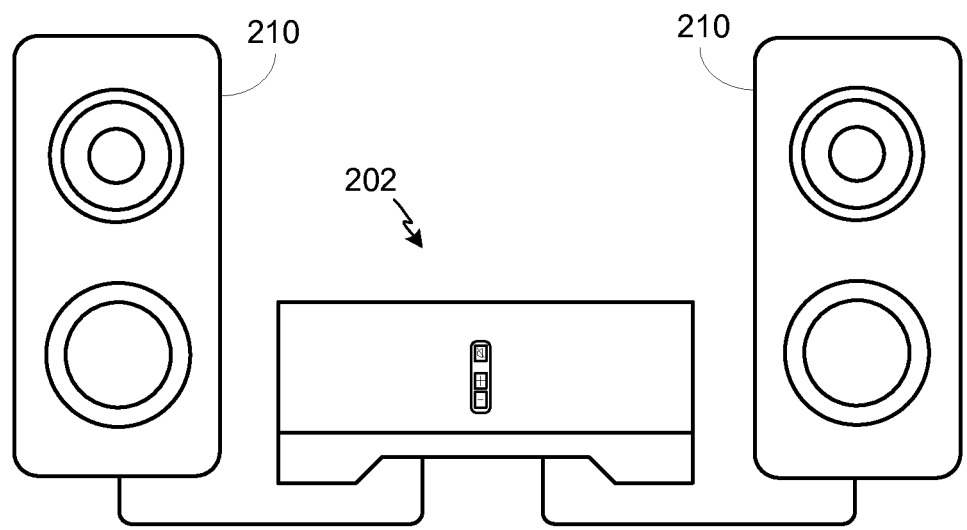
FIG. 2B shows an illustration of an example zone player having a built-in amplifier and connected to external speakers.
Figure 2C:
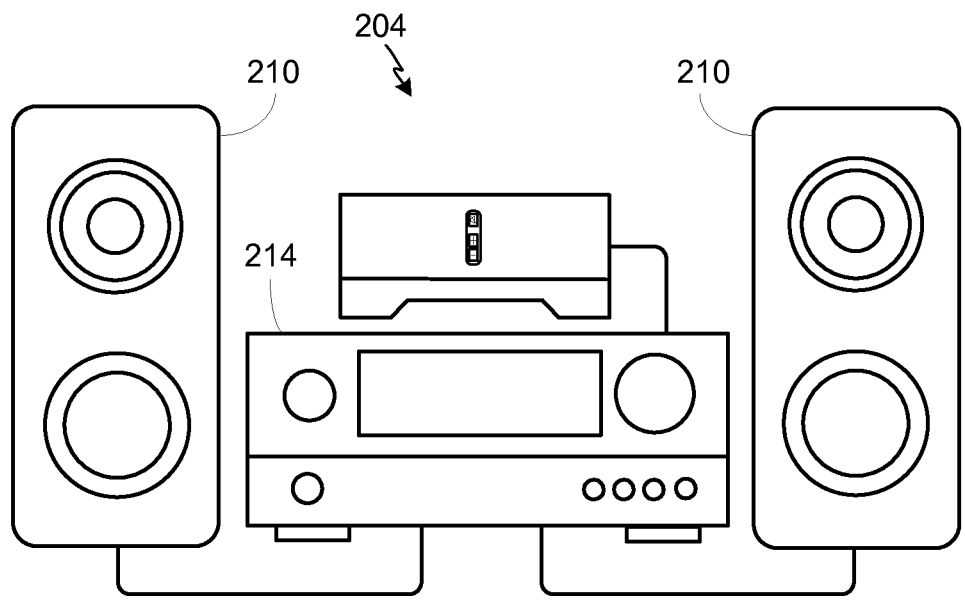
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
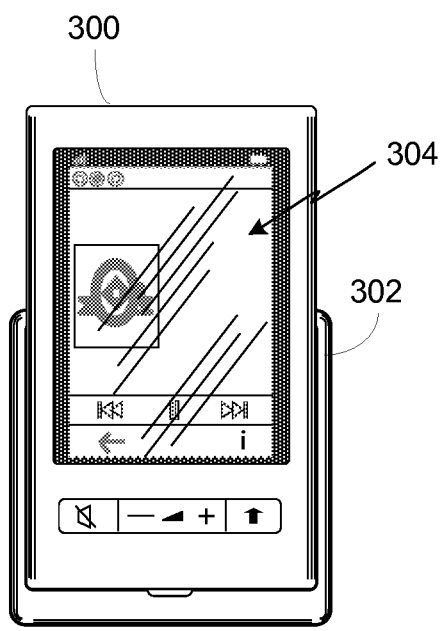
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™, "SONOS® Controller for MAC® or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and played. In some examples, the zone players 102-124 can select other audio information sources, such as network-based audio information sources (e.g., which may be accessed via the data network 128). Network-based audio information sources include, for example, a personal music library stored on a computer or networked-attached storage, Internet radio stations, shows, and podcasts, a turntable or CD player, etc. In some embodiments, music from a network-based audio information source may be accessed, for example, via a router or another network-enabled device (e.g., a PC, MAC®, network attached storage (NAS) device, IPAD®, IPHONE®, or ANDROID™ device that connects to the Internet directly to a data network). Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
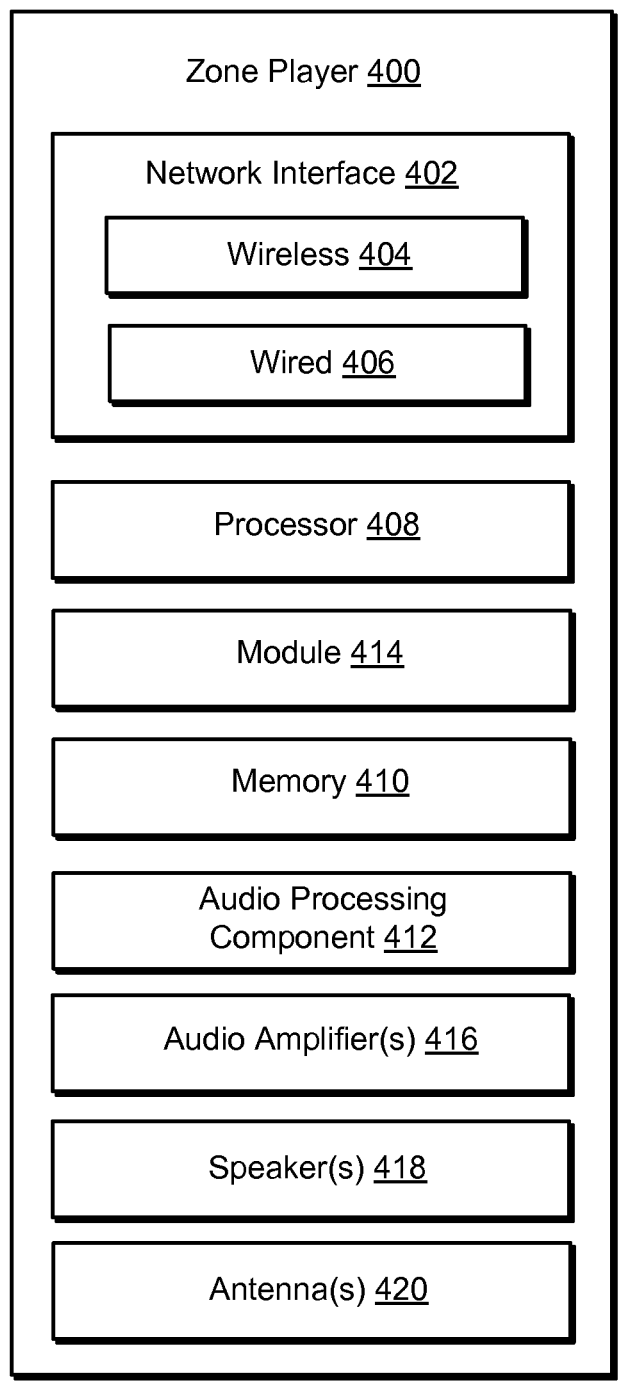
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). For example, the zone player 400 may use the wireless interface 404 to transmit audio information, control messages, commands, audio and/or video metadata, and/or other information to other devices.

Wireless interface 404 may include one or more radios to provide a radio frequency (RF) connection (e.g., using IEEE 802.11 or 802.15). To receive wireless signals and to provide the wireless signals to the wireless interface 404 and to transmit wireless signals, the zone player 400 includes one or more antennas 420. The wireless interface 404 may provide an infrared (IR) connection. The wired interface 406 provides network interface functions for the zone player 400 to communicate over a wire with other devices in accordance with a communication protocol (e.g., IEEE 802.3). The wired interface 406 may provide an optical fiber connection like TOSLINK, an audio connection using RCA connectors, a multi-media connection using high-definition multimedia interface ("HDMI"), a data connection using Ethernet, or some other wired connection. In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

Example messages transmitted and received via the example network interface 402 may be packet-based messages, such as Ethernet packets. The type of the message (e.g., volume message, source message, and so on) and/or any additional information (e.g., volume up, volume down, mute, unmute, specified audio information source, and so on) can be carried, for example, in the payload of the packet-based message. Data may additionally or alternatively be transmitted and received via the example network interface 402 using IR signals.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5™, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5™.

IV. Example Controller

Figure 5:
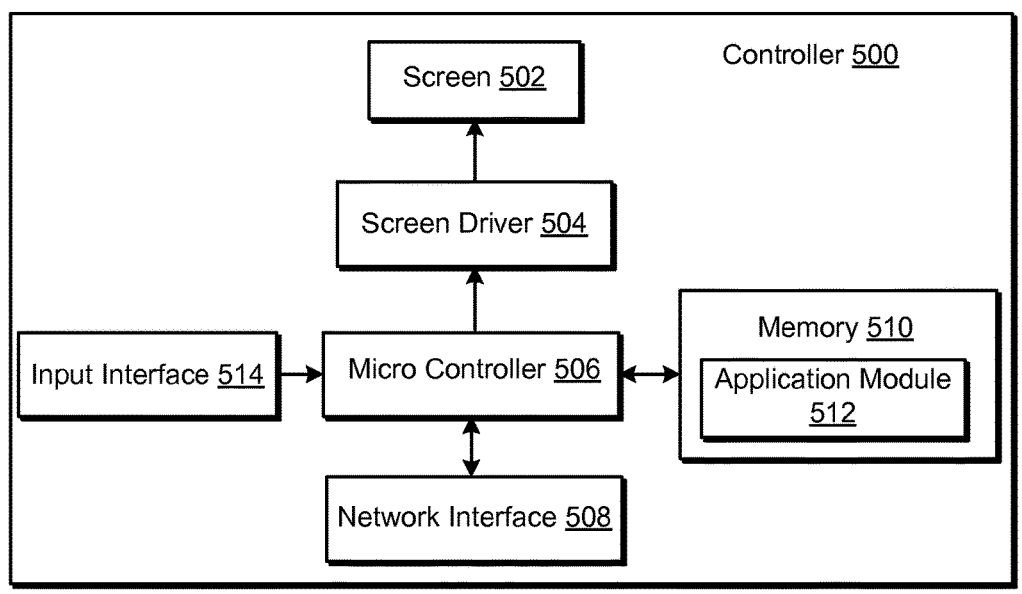
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
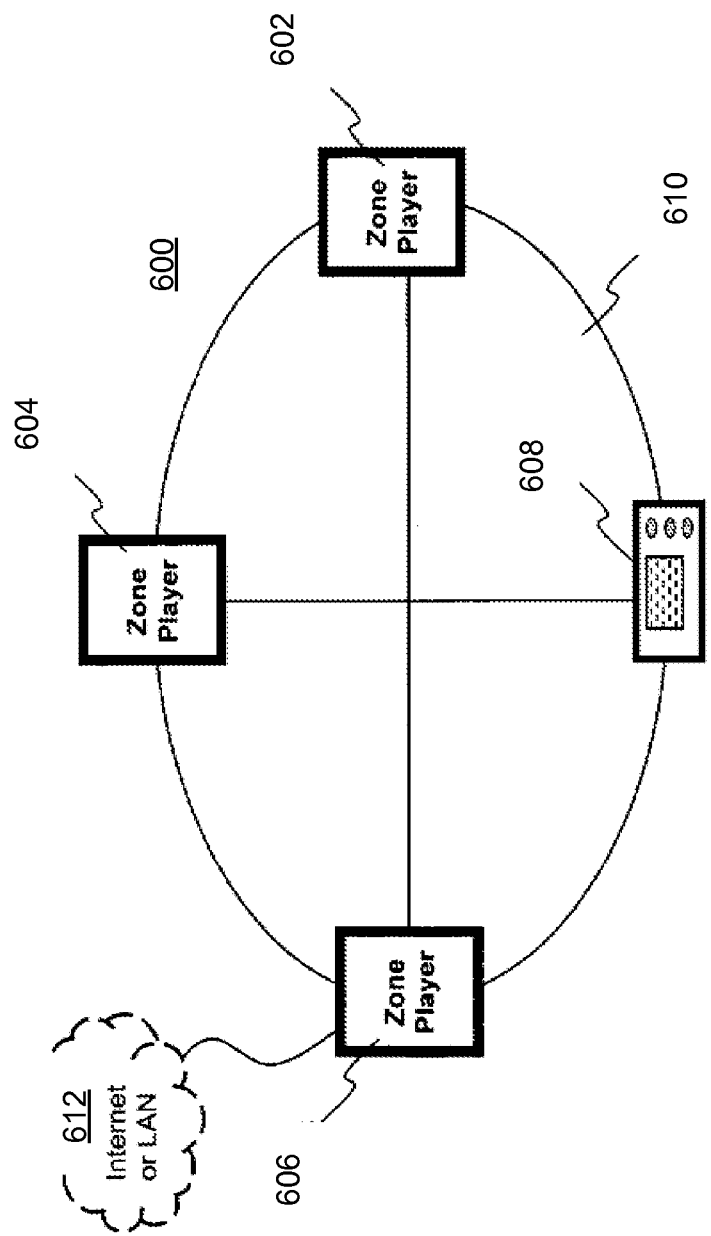
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
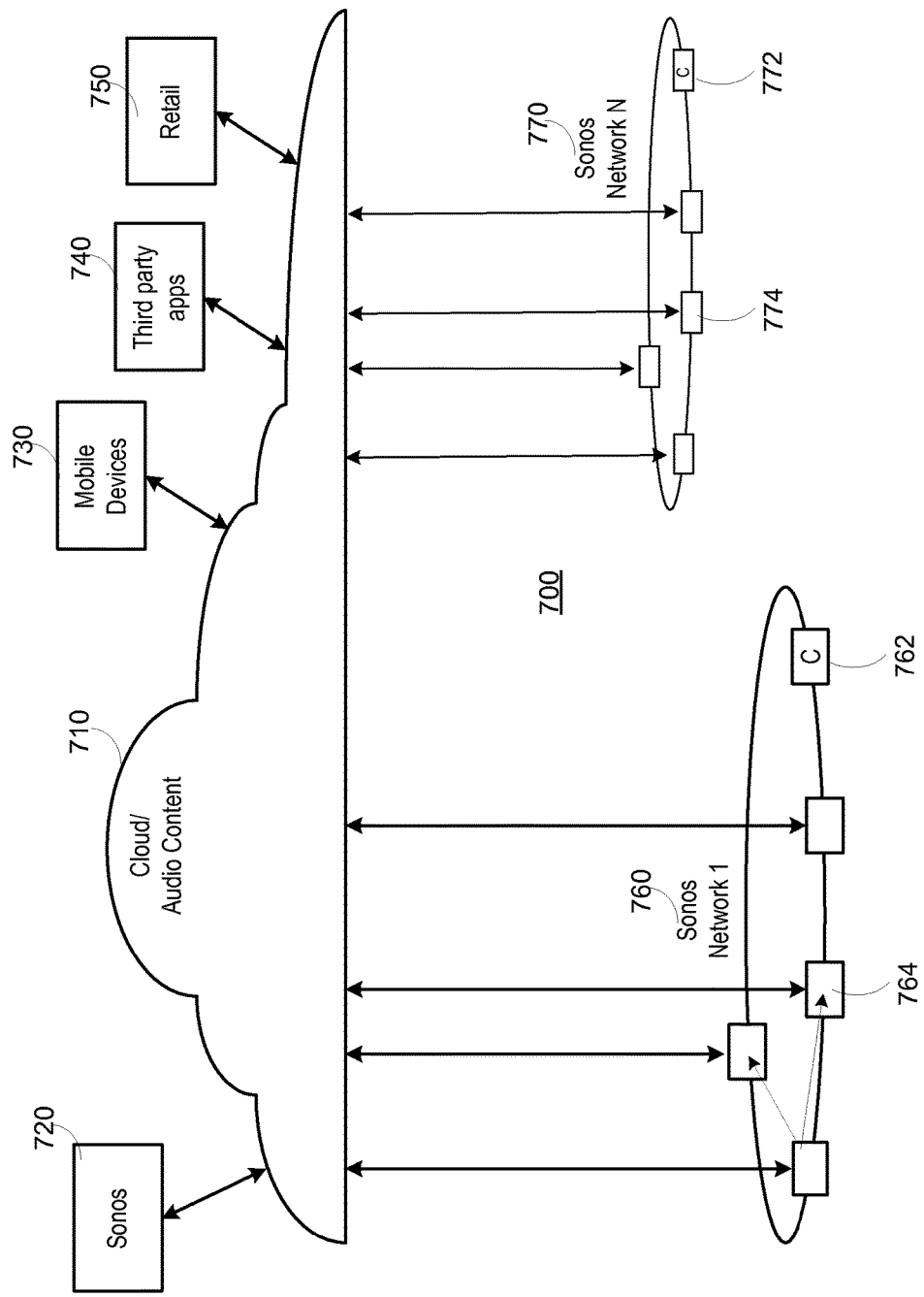
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., SONOS™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Home Theater

A playback device may process commands from a variety of controllers using a variety of code formats and/or encodings. In some examples, a remote control may be initially unknown to or undefined with respect to the playback device (e.g., the particular remote control is not associated with or sold with the playback device). In such examples, an unknown or undefined remote control may indicate that the playback device is not initially capable of interpreting or executing commands from the remote control. In the illustrated examples, the playback device may learn control commands for the variety of controllers so that the variety of controllers may be used to control the playback device without requiring an extensive or exhaustive set-up process for the user. In the illustrated examples, playback devices can learn to accept commands from a third party controller (e.g., a third party remote control or other third party controller device). In some examples, the playback device may learn all commands associated with a controller based on a single button push on the controller by the user. In some examples, commands recognized at a playback device are shared with other devices on the local network so that each device does not have to go through the learning process. In some examples, commands recognized at a playback device are shared with other playback devices via a shared resource, such as a cloud database. In such examples, a database of understood or recognized codes may be grown through a pool of playback devices. Such a method of command sharing increases the likelihood that a particular playback device will recognize a particular format or encoding used by a controller.

Figure 8:
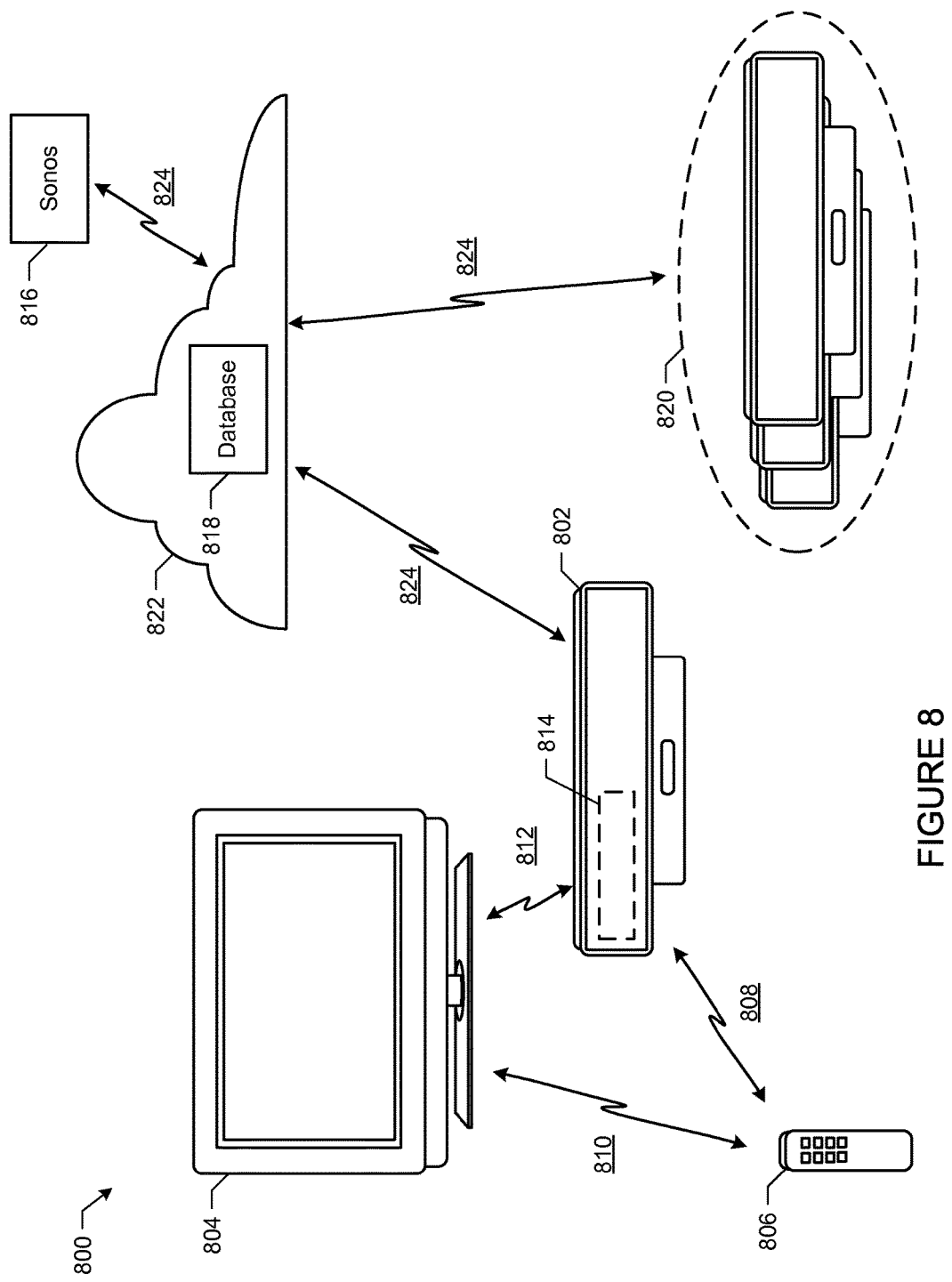
FIG. 8 shows an illustration of an example system including an audio playback device.

FIG. 8 illustrates an example system 800 including an audio playback device 802 (e.g., a zone player 400) and a display device 804. The example audio playback device 802 of FIG. 8 is a zone player such as a sound bar. However, the zone player may include any type of audio reproduction device. The example audio playback device 802 is located within a zone that may also include additional zone players such as a subwoofer and/or a rear surround device (e.g., zone players 102-124). The illustrated example of FIG. 8 can be used as a home theater system in combination with a television (e.g., the display device 804).

A controller device 806 (e.g., similar to the controller 500) is in communication with the audio playback device 802 and/or the display device 804. In some examples, the controller device 806 may correspond to the television, a universal remote control, a sound bar in addition to the television, and so on. The controller device 806 includes one or more command buttons or soft keys (e.g., software configurable buttons such as those found on a touchscreen control device) to be pressed by a user to issue commands to the display device 804. Example commands can include power ON/OFF, volume up, volume down, mute, channel control, and so on.

The example controller device 806 communicates with the audio playback device 802 via a wireless connection 808. In some embodiments, using the controller device 806, a user of the system 800 can control the example audio playback device 802 to, for example, change an audio output volume of the audio playback device 802 (e.g., increase volume, decrease volume, mute, and so on), change an audio source for playback, configure which zones are to play audio from particular audio sources, and/or perform any other settings and/or configuration adjustment to the audio playback device 802.

The example controller device 806 communicates with the display device 804 via a wireless connection 810, for example. Using the controller device 806, a user of the system 800 can communicate with the example display device 804 to, for example, control the volume on the display device 804, change an input to the display device 804, power the display device 804 on and/or off, and/or otherwise perform any other settings and/or configuration adjustment to the display device 804.

In the illustrated example, the controller device 806 controls both the audio playback device 802 and the display device 804. The controller device 806 can selectively and/or simultaneously interact with the audio playback device 802 and the display device 804. In some such examples, the audio playback device 802 and the display device 804 transmit messages and receive commands depending on which of the audio playback device 802 and the display device 804 the controller device 806 is configured to interact with for a given command. In some examples, the audio playback device 802 and the display device 804 may each have a dedicated user input device. For example, separate controllers may be used to control each of the audio playback device 802 and the display device 804.

In the illustrated example of FIG. 8, the audio playback device 802 is coupled to the example display device 804 via a wireless connection 812. The wireless connection 812 transmits audio information, control messages, commands, audio and/or video metadata, and/or other information between the audio playback device 802 and the display device 804. For example, the wireless connections 808, 810, 812 can be an infrared (IR) connection, a radio frequency (RF) connection, any other wireless connection, or some combination thereof. The audio playback device 802 may additionally or alternatively be coupled to the example display device 804 via a wired connection. For example, the wired connection can be an optical fiber connection like TOSLINK, an audio connection using RCA connectors, an HDMI connection, a data connection using Ethernet, some other wired connection, or some combination thereof. While some display devices, such as televisions, are provided with audio output mechanisms (e.g., speakers), in the example system 800, the audio playback device 802 outputs the audio instead of (or in complement to) any audio output mechanisms on the display device 804.

In some embodiments, the example audio playback device 802 can select between multiple sources of audio information, of which one is the display device 804. In some examples, the display device 804 represents multiple potential sources of audio information when the display device 804 functions as a switch or hub for additional devices. In some examples, the display device 804 is a television that can switch between different input devices such as video game consoles, cable, satellite, and/or broadcast television programs, DVD players, Blu-ray players, video cassette players, digital video players, and/or any other input device.

In addition to the example display device 804, the audio playback device 802 can select other audio information sources, such as network-based audio information sources. Network-based audio information sources include, for example, a personal music library stored on a computer or networked-attached storage, Internet radio stations, shows, and podcasts, a turntable or CD player, etc. Network-based audio information sources may be accessed, for example, via a router or another network-enabled device (e.g., a PC, MAC®, network attached storage (NAS) device, IPAD®, IPHONE®, or ANDROID™ device that connects to the Internet directly to a data network). The example audio playback device 802 may be coupled to a router or other network-enabled device via a wired or wireless connection, which enables access to network-based audio information sources (e.g., via the Internet and/or a local area network). In another example, the audio playback device 802 has direct access to network-based audio information sources through, for example, a 3G or 4G connection or a broadband connection directly.

The example messages transmitted and received by the example audio playback device 802 and the example display device 804 may be packet-based messages, such as Ethernet packets. The type of the message (e.g., volume message, source message, and so on) and/or any additional information (e.g., volume up, volume down, mute, unmute, specified audio information source, and so on) can be carried, for example, in the payload of the packet-based message. Data may additionally or alternatively be transmitted and received by the example audio playback device 802 and the example display device 804 using IR signals.

The example audio playback device 802 includes an example code processor 814 to enable the audio playback device 802 to learn the particular of type of controller device 806 that is being used in the system 800. Controllers (e.g., the controller device 806) implemented with infrared technology transmit a pulse of infrared light when a selection is made (e.g., a particular button, item, option, and so on is selected on the controller). The pulse of infrared light represents a code (e.g., a binary code) that corresponds to a particular command (e.g., power on). Different controllers may use different codes to represent the same and/or different commands. For example, a particular code may represent power on for one controller, but represent volume up for another controller. The example code processor 814 allows the audio playback device 802 to determine the particular codes used by the controller device 806 so that the audio playback device 802 may carry out the commands associated with the particular codes (e.g., the remote functionality may be programmed into the audio playback device 802). The example code processor 814 enables the audio playback device 802 to learn the codes associated with the controller device 806 with minimal effort by a user so that the commands associated with the codes may be executed (or relayed for execution). The user is not required to perform a complicated set-up and/or installation process to utilize the controller device 806 in the system 800. Thus, the audio playback device 802 can learn to accept commands from the controller device 806, which may be a third party controller.

In some examples, a user may select (e.g., via a push button on the audio playback device 802) a run mode or a learn mode. In the run mode, the audio playback device 802 has already recognized the controller device 806 and, thus, is able to process commands from the controller device 806 without implementing any learning process. In the learn mode, the user may be prompted to input a single command using the controller device 806, and the audio playback device 802 may recognize the single input command. Using the recognized single input command, the audio playback device 802 may determine other commands associated with the particular controller device 806, and may store these other commands for future command identification and processing. If the audio playback device 802 does not recognize the single input command, the audio playback device 802 automatically implements a full command learning process that prompts the user to input a variety of commands on the controller device 806. The commands input during the full command learning process are stored for future command identification and processing and may be shared with other audio playback devices.

In some examples, the user inputs a single command on the controller device 806 without first selecting a run mode or a learn mode on the audio playback device 802. If the audio playback device 802 recognizes the input command, the audio playback device 802 processes the input command. The audio playback device 802 may set a bit (e.g., a "controller associated" bit) that may be processed to determine if a controller has been associated with the audio playback device 802 (e.g., if the audio playback device 802 recognizes the input command). In addition to, or in lieu of, setting a bit, the audio playback device 802 may update a state variable identifying the code associated with the recognized command. For example, the state variable IR_Volume_UP may be used to identify an IR code associated with the "volume UP" command. In some examples, other playback devices on the local network may query the playback device for the value of the state variable to avoid having to learn the command themselves. If the audio playback device 802 does not recognize the input command, the audio playback device 802 implements the command learning process to determine the commands associated with the particular controller device 806.

When a user enters a command on the controller device 806, the controller device 806 generates and transmits an infrared signal representative of that command to the display device 804 and/or the audio playback device 802. In some examples, the audio playback device 802 may serve as an intermediary between the controller device 806 and the display device 804 such that the audio playback device 802 receives the infrared signal and relays the signal and/or code representative of the signal to the display device 804 or other devices for execution of the entered command. In some examples, the audio playback device 802 receives and processes the infrared signal from the controller device 806 to execute the command.

The example code processor 814 receives the infrared signal and decodes the infrared signal to obtain a code representative of the command entered by the user. The example code processor 814 searches a local code database for the entered command code. The local code database stores identifiers of controllers (e.g., the controller device 806) along with the commands and command codes associated with the controllers. If the entered command code is found in the local code database, the example code processor 814 executes the command associated with the entered command code (e.g., if the entered command was "power on," the example code processor 814 will power on the audio playback device 802). If the entered command code is not found in the local code database, the example code processor 814 sends a message to a multimedia playback system 816 (e.g., SONOS™) with the entered command code. The example playback system 816 provides services, such as remote control command sharing, to the system 800. The example playback system 816 may be, for example, a remote "cloud server" (e.g., the Sonos cloud server 720 in FIG. 7). In some examples, the example playback system 816 represents a single server device or a collection of servers such as a server farm.

When the example playback system 816 receives a message with an entered command code, the example playback system 816 searches a code database 818 for the entered command code. The code database 818 may be a cloud-based database or may be associated with the example playback system 816, for example. The code database 818 of the illustrated example may be similar to the code database stored at the audio playback device 802 and stores commands and command codes for a variety of controllers. In some examples, the audio playback device 802 may not have local storage and may use only the code database 818 to identify command codes. However, by including local storage in the audio playback device 802, the audio playback device 802 may recognize command codes locally when, for example, the code database 818 is unavailable (e.g., when the playback service 816 is temporarily inoperative).

If the entered command code is found in the code database 818, the example playback system 816 sends a response message to the example code processor 814 that includes the command associated with the entered command code, along with any other commands and codes associated with the particular controller device 806. For example, the entered command code may be representative of the "volume up" command. In such an example, the example playback system 816 sends a response message including the "volume up" command, as well as other commands and associated codes for the controller device 806 such as, for example, the command and code associated with "volume down," "mute," "power on," "power off," etc. The response message may also include an identifier of the controller device 806.

In some examples (e.g., where a learn mode is not being utilized), once the example code processor 814 receives the response message from the playback system 816, the example code processor 814 executes the command associated with the entered command code. The example code processor 814 also updates the local code database with the commands and codes included in the response message. Thus, the example code processor 814 is able to recognize other commands entered by a user associated with the remote control 806 by searching the local code database for the entered command codes.

If the example playback system 816 searches the code database 818 for an entered command code but does not find the entered command code, the example playback system 816 sends a response message to the code processor 814 indicating that the entered command code was not recognized. When the example code processor 814 receives such a response message, the example code processor 814 implements a learning process to learn commands associated with the remote control 806. To implement the learning process, the example code processor 814 prompts the user to input a particular command (e.g., using audio instructions, visual instructions, etc). Once the user has input the particular command, the example code processor 814 receives an infrared signal representative of the particular command, decodes the infrared signal, and stores the entered command code from the decoded signal with an identifier of the command. For example, the code processor 814 may prompt a user to enter the "volume up" command. Once the "volume up" command has been entered by the user, the code processor 814 decodes a received infrared signal to obtain the command code representative of the "volume up" command. The code processor 814 stores an identifier of the "volume up" command with the associated command code in the local code database for future code identification. The code processor 814 repeats the prompting and decoding process for a variety of commands (e.g., "volume up," "volume down," "mute," "power on," "power off," etc.). Once the example code processor 814 has performed the prompting and decoding process for the variety of commands, the code processor 814 sends a message to the example playback system 816 with the learned commands and command codes. The example playback system 816 updates the code database 818 with these learned commands and command codes for future code identification (e.g., the learned commands and command codes are sent to a network server or cloud database). The example playback system 816 may also update a state variable identifying the command and command code. For example, the playback system may update the IR_Volume_UP state variable to identify the command code for "volume up."

Additionally, the example playback system 816 sends a message to a pool of playback devices 820 with the learned commands and command codes. Each playback device of the pool of playback devices 820 stores the learned commands and command codes in their respective local code database for future code identification. The pool of playback devices 820 is a plurality of playback devices (e.g., including the playback device 802) implemented in the system 800, for example. The pool of playback devices 820 may be within a same location (e.g., household) as the audio playback device 802 or may be in different locations (e.g., households) from the audio playback device 802. In some examples, the audio playback device 802 may send a message with the learned commands and command codes directly to the pool of playback devices 820. The learned commands and command codes may be shared periodically and/or aperiodically. In some examples, a user may set the command sharing to an auto-update mode. In some such examples, the audio playback device 802 and/or the example playback system 816 send a learned command and command code to the pool of playback devices 820 upon learning the command and command code (e.g., immediately upon learning the command and command code). In some examples, the audio playback device 802 and/or the example playback system 816 collect a plurality of learned commands and command codes and send a single update to the pool of playback devices 820 with the plurality of learned commands and command codes.

In some examples, the playback system 816 may identify more than one set of commands and command codes associated with the entered command code provided by the code processor 814. For example, multiple remote controls may share a command code for a particular command, but may not share other command codes for other commands. In such an example, the playback system 816 may not identify the appropriate set of commands and command codes (e.g., which commands and command codes are associated with the controller device 806). If multiple remote controls share the entered command code, the playback system 816 may provide all sets of commands and command codes associated with the entered command code to the code processor 814. For example, the playback system 816 may send two separate sets of commands and command codes to the code processor 814. The code processor 814 may then prompt the user to enter a different command to determine which set of commands and command codes corresponds to the remote control 806. The code processor 814 identifies the command code associated with the newly entered command and stores those commands and command codes to be used with the remote control 806.

The database 818 of the illustrated example is implemented using a cloud service 822. The cloud service 822 acts as a shared network resource and provides access to the database 818 to the example playback system 816, the example playback device 802, and/or the example pool of playback devices 820. The database 818 allows the playback device 802 and the pool of playback devices 820 to share learned commands and command codes to facilitate a more efficient remote control learning process at each of the devices. Sharing learned commands and command codes via the database 816 allows a third-party controller (e.g., the controller device 806) to be used to control the audio playback device 802 and/or the display device 804. While the cloud service 822 is used in the illustrated example to provide access to the database 818, any other shared network resource may be used to provide such access. Though the database 818 is shown in the cloud service 822 in the illustrated example, the database 818 may be located at other locations, for example, at the playback system 816. The cloud service 822 communicates with the example playback system 816, the example playback device 802, and/or the example pool of playback devices 820 via wireless connections 824. The wireless connection 824 can be an infrared (IR) connection, a radio frequency (RF) connection, a Bluetooth connection, any other wireless connection, or some combination thereof. In some examples, the cloud service 822 communicates with the example playback system 816, the example playback device 802, and/or the example pool of playback devices 820 via a device connected to the Internet (e.g., via a wired or wireless connection, a 3G or 4G connection, etc.). In some examples, authentication may occur when connecting to the Internet.

VIII. Example Code Processor

Figures 9A, 9B:
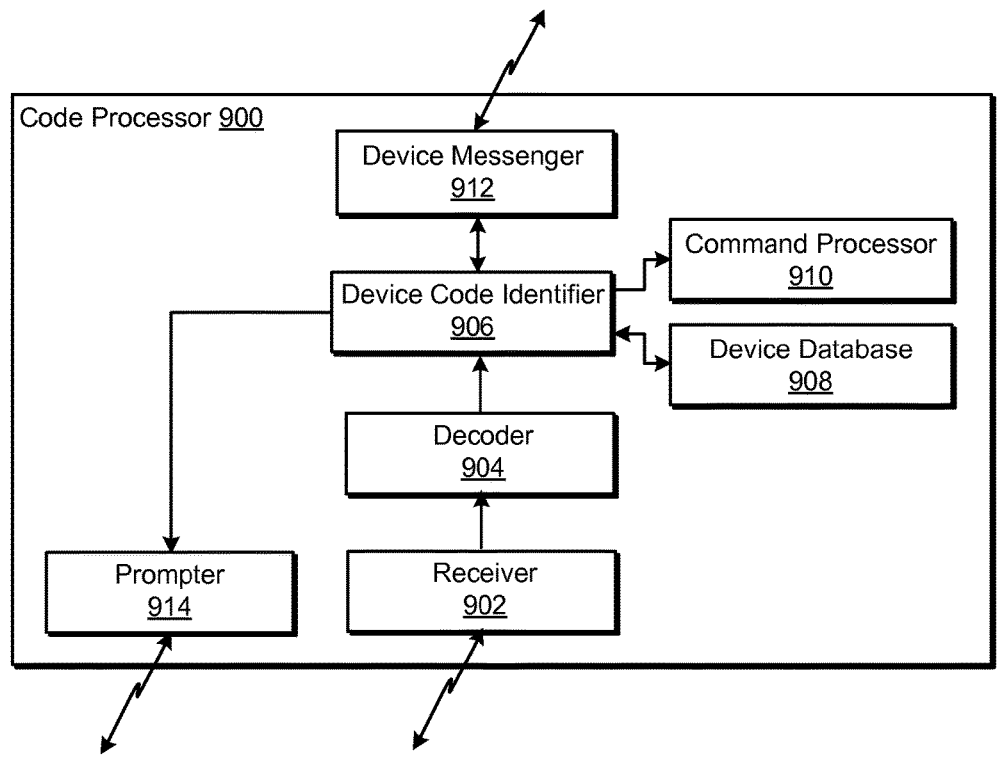
FIG. 9A shows an internal functional block diagram of an example code processor.
FIG. 9B shows an example code database entry.

FIG. 9A shows an internal functional block diagram of an example code processor 900 (e.g., the example code processor 814 of FIG. 8). The example code processor 900 is implemented within an audio playback device (e.g., the example audio playback device 802 of FIG. 8) to enable the audio playback device to function with third party controllers without requiring the controller to learn a new code set. The example code processor 900 enables the audio playback device to learn commands associated with a third party controller. The example code processor 900 processes infrared signals representative of commands (e.g., "volume up") received from a controller, identifies and executes (or relays) the commands, and/or implements a learning process to learn the commands. The example code processor 900 of FIG. 9A includes an example receiver 902, an example decoder 904, an example device code identifier 906, an example device database 908, an example command processor 910, an example device messenger 912, and an example prompter 914.

The example receiver 902 receives an infrared signal from a device (e.g., the controller device 806 of FIG. 8) representative of a command (e.g., "volume up," "volume down," "mute," etc.) input by a user. The example receiver 902 may be implemented using, for example, photodiodes.

The example decoder 904 decodes the received infrared signal into a code associated with the command entered by the user at the device. The code associated with the command may be referred to herein as a command code or an entered command code.

The device code identifier 906 is used to identify and/or learn entered command codes. Because there are a variety of control devices that implement a variety of command codes, the device code identifier 906 allows an audio playback device to operate with any of such variety of control devices with reduced or minimal user interaction. For example, a user may enter a single command on a controller and the device code identifier 906 may identify that particular command as well as other command codes associated with the particular controller for future command identification.

The device code identifier 906 obtains an entered command code from the decoder 904 and searches for the entered command code in the device database 908. The device database 908 stores commands and command codes for particular controllers. An example data structure 901 of FIG. 9B is illustrative of data that may be stored at the device database 908. In the illustrated example, the data structure 901 includes data associated with controller types 903, codes 905, and commands 907. Any controller type, code, and/or command may be stored in the example data structure 901 at the device database 908. For example, for a Remote Control 3000, the device database 908 may store a text identifier of the Remote Control 3000 as the remote type 903, along with a code "1234" as the code 905 and a command "volume up" as the command 907. If the device code identifier 906 receives the code "1234" from the decoder 904, the device code identifier 906 searches the device database 908 for the code "1234." If the code "1234" is stored in the database (e.g., in the code 905), the command associated with the code "1234" (e.g., "volume up") is returned to the device code identifier 906.

The command processor 910 is used to execute the commands returned to the device code identifier 906. If an entered command code is found to be associated with a command (e.g., the "volume up" command), the command processor 910 executes the command (e.g., increase the volume of the audio playback device 802). The command processor 910 executes a variety of commands, including those illustrated in the example data structure 901 of FIG. 9B. In some examples, command codes may be relayed to another device (e.g., the display device 804 of FIG. 8) for command execution.

The device messenger 912 is used to communicate with a playback system (e.g., the playback system 816 of FIG. 8). The device messenger 912 sends messages to the playback system and receives response messages from the playback system. An example playback system is described below with reference to FIG. 10. If an entered command code is not found in the device database 908 by the device code identifier 906, the device messenger 912 sends a message to the playback system with the entered command code. The playback system searches a code database for the entered command code in a manner similar to that performed by the device identifier 906 to search the device database 908. If the playback system finds the entered command code, the playback system sends a response message to the device messenger 912 with the command associated with the entered command code. The response message received by the device messenger 912 also includes other commands and command codes associated with the particular remote control. For example, the entered command code may be associated with the command "volume up," but the response message will include the command codes for "volume up," "volume down," "mute," "play," and "pause" for the particular remote control (e.g., the Controller 500 of FIG. 9B). The device code identifier 906 obtains the received commands and command codes from the device messenger 912 and stores the commands and command codes in the device database 908 for later command identification. In addition to storing the commands and command codes, the device code identifier 906 may send the identified command associated with the entered command code to the command processor 910 for command execution.

If the playback system searches a code database for the entered command code and does not find the entered command code, the playback system sends a response message to the device messenger 912 indicating the entered command code was not found. If the entered command code was not found by the device code identifier 906 in the device database 908 or by the playback system, the device code identifier 906 may automatically implement a learning process to learn commands associated with the particular controller being used to control the audio playback device.

To implement the learning process, the device code identifier 906 may prompt a user to input a particular command via the prompter 914. For example, the device code identifier 906 may use the prompter 914 to prompt the user to enter "volume up" on the remote control. The prompt output by the prompter 914 may include, for example, audible instructions, audible tones or jingles, lights, displays, etc. For example, the prompter 914 may display written instructions via a display device (e.g., the display device 804 of FIG. 8). In some examples, a user may be prompted to input a particular command via a prompter on a device separate from the code processor 900 (e.g., via a prompter on another controller). Once the user inputs the particular command on the remote control, the receiver 902 receives an infrared signal representative of the command and the decoder 904 decodes the infrared signal. The device code identifier 906 obtains the decoded command code from the decoder 904 and stores the command code with the associated command in the device database 908. The prompter 914 may also be used by the device code identifier 906 to provide a confirmation to the user that the prompted command was received and identified.

The device code identifier 906 may prompt the user to enter the particular command multiple times to increase the likelihood of storing the correct command code with the particular command. The device code identifier 906 repeats the learning process for a variety of common commands. For example, the device code identifier 906 may prompt the user to input "volume up," "volume down," "mute," "play," and "pause," and may decode and store the command codes associated with each of these commands.

Once the device code identifier 906 has implemented the learning process for the variety of common commands, the device messenger 912 sends a message to the playback system with the learned commands and command codes. The message may also include an identification number associated with the audio playback device, an identification number associated with the household using the audio playback device, a timestamp, etc. The message with the learned commands and command codes may be sent by the device messenger 912 when the commands and command codes are learned, periodically, when the audio playback device is inactive (e.g., when the device is not in use), etc. The playback system may store and/or distribute these learned commands to other audio playback devices to increase the likelihood of command identification at each of the audio playback devices. The playback system may also return an acknowledgement message to the device messenger 912 indicating that the learned commands and command codes were received at the playback system.

In some examples, the prompter 914 may be used to allow a user to initially select a run mode or a learn mode. In the run mode, the code processor 900 has already recognized the remote control and, thus, is able to process commands from the remote control without implementing any learning process. In the learn mode, once the user has selected such a mode, the user may be prompted by the prompter 914 to input a single command using the remote control. The process of identifying the single command and, if the single command is not identified by the device code identifier 906, the full command learning process are then implemented by the code processor 900 as described above. In some examples, the device code identifier 906 may include a timer to allow the learn process to time out if the user does not enter a command after prompted via the prompter 914. For example, the user may be prompted via the prompter 914 to enter the "volume up" command and, if the user does not enter the command within seven seconds, the learning mode times out. The prompter 914 may be used to indicate the time out to the user, for example, by emitting a flashing red light. In some examples, a prompter on a device separate from the code processor 900 (e.g., via a prompter on another controller) may be used to indicate the time out to the user.

In some examples, the playback system may identify more than one set of commands and command codes associated with the entered command code contained in a message from the device messenger 912. For example, multiple remote controls may share a command code for a particular command, but may not share other command codes for other commands. In such an example, the playback system may not identify the appropriate set of commands and command codes (e.g., which commands and command codes are associated with the particular remote control). If multiple remote controls share the entered command code, the playback system may provide all sets of commands and command codes associated with the entered command code in the message sent to the device messenger 912. For example, the playback system may send two separate sets of commands and command codes to the device messenger 912. In such an example, the device code identifier 906 may then prompt the user via the prompter 914 to enter a different command to determine which set of commands and command codes corresponds to the particular remote control. The device code identifier 906 obtains the command code associated with the newly entered different command and locates the new command code in the codes provided by the playback system. Where the new command code is located in a particular set of commands and command codes, the device code identifier 906 stores the particular commands and command codes in the device database 908 to be used with the particular controller. Thus, playback devices can learn to accept commands from a third party controller and can query the database if it does not recognize a controller or a command.

VIII. Example System Processor

Figure 10:
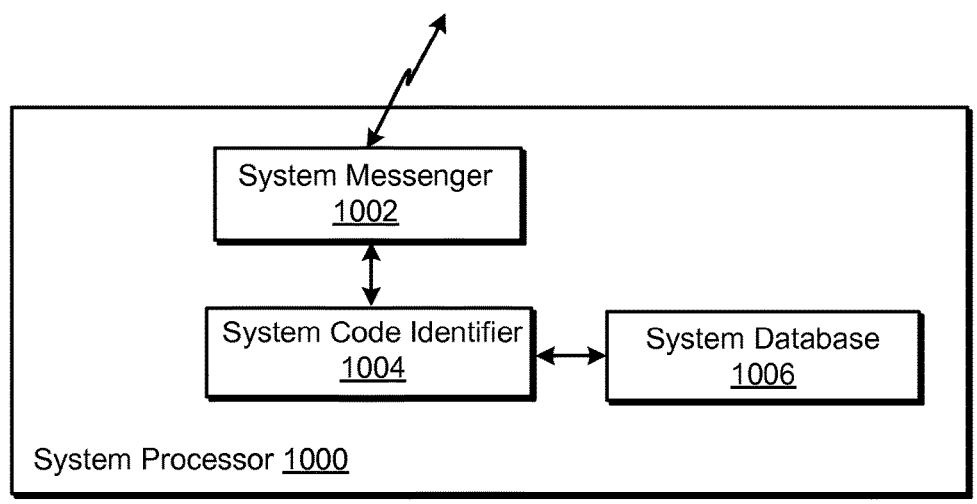
FIG. 10 shows an internal functional block diagram of an example system processor.

FIG. 10 shows an internal functional block diagram of an example system processor 1000. The example system processor 1000 is implemented within a playback system (e.g., implemented at the example playback system 816 of FIG. 8) to enable the playback system to learn commands associated with controllers used to control audio playback devices. The example system processor 1000 processes messages received from audio playback devices to assist the audio playback devices in identifying particular commands used by particular remote controls to control the audio playback devices. The example system processor 1000 stores commands and associated command codes on a network database, such as a cloud-based server database. The example system processor 1000 also publishes commands and associated command codes to a pool of audio playback devices (e.g., a plurality of playback devices that subscribe to the playback system) to facilitate more efficient identification of commands at each of the plurality of playback devices. The example system processor 1000 of FIG. 10 includes an example system messenger 1002, an example system code identifier 1004, and an example system database 1006.

The example system messenger 1002 is used to communicate with a pool of audio playback devices (e.g., the playback device 802 of FIG. 8). The system messenger 1002 may receive messages from a single audio playback device and may send messages to one or more audio playback devices subscribed to the playback system. The system messenger 1002 receives a message from an audio playback device that includes an entered command code (e.g., a code representative of a command entered by a user on a controller). To assist the audio playback device in identifying the command associated with the entered command code, the system code identifier 1004 searches the system database 1006 for the entered command code. The system database 1006 is similar to the device database 908 of FIG. 9A. The system database 1006 stores commands and command codes for particular controllers. The example data structure 901 of FIG. 9B is similar to data that may be stored at the system database 1006.

If the system code identifier 1004 finds the entered command code in the system database 1006, the system messenger 1002 sends a response message to the audio playback device with the command associated with the entered command code. The response message sent by the system messenger 1002 also includes other commands and command codes associated with the particular controller. For example, the entered command code may be associated with the command "volume up," but the response message will include the command codes for "volume up," "volume down," "mute," "play," and "pause" for the particular controller. The audio playback device may store the commands and command codes for later command identification. If more than one set of commands and command codes include the entered command code (e.g., where controllers share some, but not all command codes), the system messenger 1002 includes all the sets of commands and command codes in the message to the audio playback device. The audio playback device may then narrow down the sets of commands and command codes to identify the appropriate set by prompting the user to enter additional commands.

If the system code identifier 1004 searches the system database 1006 for the entered command code and does not find the entered command code, the system messenger 1002 sends a response message to the audio playback device indicating the entered command code was not found. If the entered command code is not found by the system processor 1000 (or locally), the audio playback device may implement a learning process to learn commands associated with the particular remote control being used to control the audio playback device. The learning process used by the audio playback device is described above in connection with FIG. 9.

Once the audio playback device has implemented the learning process for a variety of common commands, the audio playback device sends a message to the system processor 1000 with the learned commands and command codes. The message may also include an identification number associated with the audio playback device, an identification number associated with the household using the audio playback device, a timestamp, etc. The system messenger 1002 receives the message with the learned commands and command codes. If, for example, an error is detected in the commands, command codes, identification data, etc., the system messenger 1002 may return an error message to the audio playback device.

The system code identifier 1004 stores the learned commands and command codes in the system database 1006. The system code identifier 1004 may validate the command codes received from an audio playback device by, for example, requiring multiple submissions for those command codes from various audio playback devices. For example, three audio playback devices may provide particular command codes for a particular remote control and the system code identifier 1004 may then determine that these command codes have been validated. The system code identifier 1004 may store validated command codes separate from those command codes not validated and/or flag command codes to be validated, for example.

The system messenger 1002 may send an acknowledgement message to the audio playback device once the message with the learned commands and command codes has been received. The system messenger 1002 also sends a message to the pool of audio playback devices (e.g., the plurality of playback devices subscribed to the playback system) that includes the learned commands and command codes. In some examples, the system messenger 1002 may send the message with the learned commands and command codes once they have been validated. Each audio playback device may store the learned commands and command codes locally to facilitate more efficient identification of commands at each audio playback device.

While the example code processor 900 and system processor 1000 have been illustrated in FIGS. 9A and 10, one or more of the interfaces, data structures, elements, processes and/or devices illustrated in FIGS. 9A and 10 can be combined, divided, re-arranged, omitted, eliminated and/or implemented in any way. Further, the example receiver 902, the example decoder 904, the example device code identifier 906, the example device database 908, the example command processor 910, the example device messenger 912, the example prompter 914, the example system messenger 1002, the example system code identifier 1004, the example system database 1006, and/or more generally, the example code processor 900 and/or the example system processor 1000 can be implemented by hardware, software, firmware and/or any combination of hardware, software and/or firmware. Thus, for example, any of the example receiver 902, the example decoder 904, the example device code identifier 906, the example device database 908, the example command processor 910, the example device messenger 912, the example prompter 914, the example system messenger 1002, the example system code identifier 1004, the example system database 1006, and/or more generally, the example code processor 900 and/or the example system processor 1000 could be implemented by one or more circuit(s), programmable processor(s), application specific integrated circuit(s) (ASIC(s)), programmable logic device(s) (PLD(s)) and/or field programmable logic device(s) (FPLD(s)), and so on.

When any apparatus claim of this patent is read to cover a purely software and/or firmware implementation, at least one of the example receiver 902, the example decoder 904, the example device code identifier 906, the example device database 908, the example command processor 910, the example device messenger 912, the example prompter 914, the example system messenger 1002, the example system code identifier 1004, and/or the example system database 1006 are hereby expressly defined to include a computer readable medium such as a memory, DVD, CD, and so on, storing the software and/or firmware. Further still, the example code processor 900 and/or the example system processor 1000 can include one or more elements, processes and/or devices in addition to, or instead of, those illustrated in FIGS. 9A and 10, and/or can include more than one of any or all of the illustrated elements, processes and devices.

Figure 11:
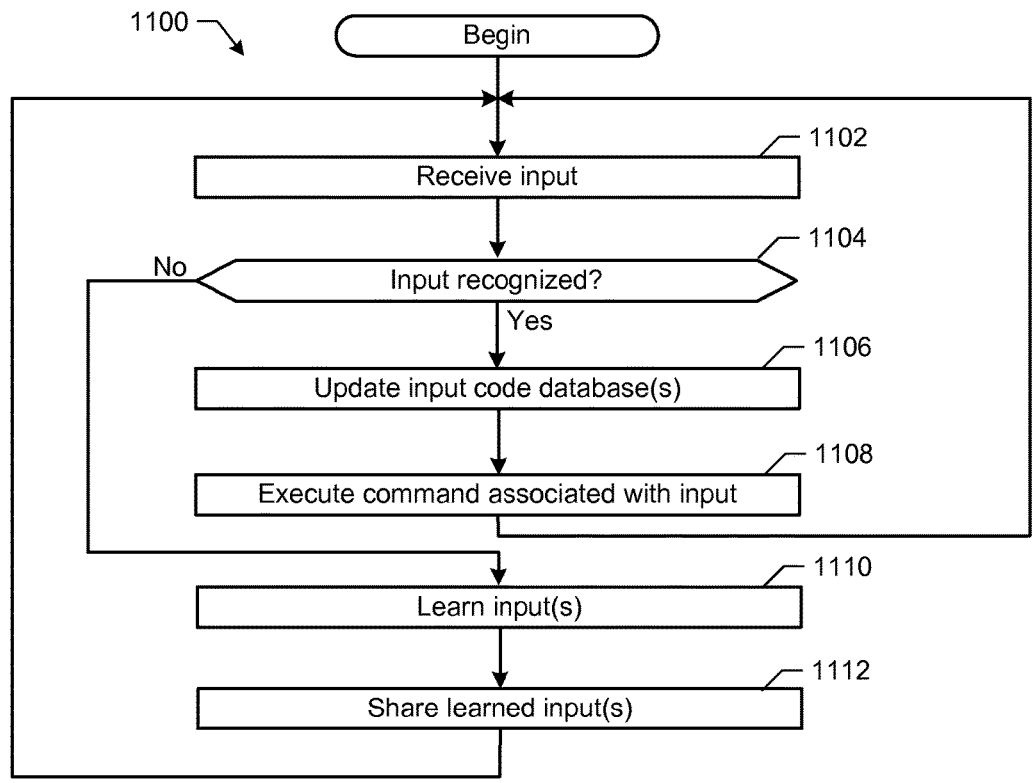
FIG. 11 shows a flowchart representative of an example method to process a code command.

FIG. 11 shows a flowchart representative of an example method 1100 to process a code command. The example method 1100 of FIG. 11 begins when an example audio playback device (e.g., the audio playback device 802 of FIG. 8) receives an input from a controller (e.g., the controller device 806 of FIG. 8) (block 1102). The input of the illustrated example is an infrared signal representative of a remote control command and the audio playback device 802 decodes the signal into a command code. The audio playback device 802 determines if the input (e.g., the command code) is recognized (block 1104). For example, the audio playback device 802 determines if the input is recognized such that the command associated with the command code is found and may be executed at the audio playback device 802. To determine if the input is recognized, the audio playback device 802 searches a local database of command codes and/or a database of command codes implemented by a network-shared resource (e.g., at the database 818 of FIG. 8) for the particular command code input by the user. If the input is recognized, the audio playback device 802 updates its local code database (block 1106). For example, if the particular command code was stored at the network-shared resource database 818, the audio playback device 802 stores the particular command and command code locally along with any other commands and command codes associated with the particular remote control 806. The audio playback device 802 may also execute the command associated with the particular command code (block 1108). For example, if the command associated with the particular command code is "volume up," the audio playback device 802 will increase its volume. Control then returns to block 1102.

If the input is not recognized (e.g., if the particular command code is not found) (block 1104), the audio playback device 802 implements a learning process to learn commands and command codes associated with the particular remote control 806 (block 1110). The audio playback device 802 stores the learned commands and command codes locally and shares the learned commands and command codes (block 1112). For example, the audio playback device sends the learned inputs to a playback system (e.g., the playback system 816 of FIG. 8) to store the learned inputs in the database 818 and to publish the learned inputs to a pool of audio playback devices (e.g., the pool of audio playback devices 820 of FIG. 8). Control then returns to block 1102 where the user may enter the same or different command for recognition and execution.

Figure 12:
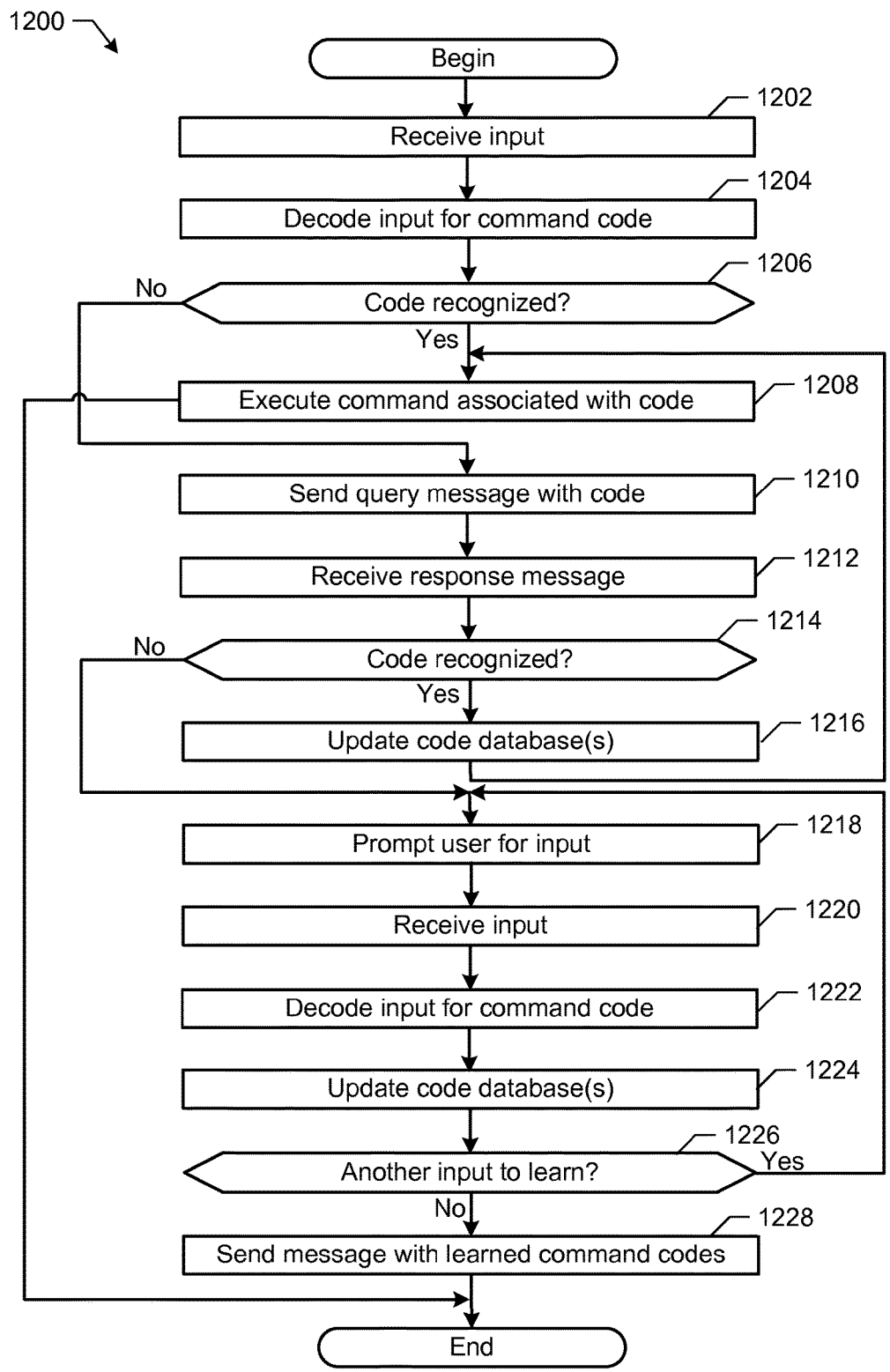
FIG. 12 shows another flowchart representative of another example method to process a code command.

FIG. 12 shows a flowchart representative of a more detailed example method 1200 to process a code command at a code processor (e.g., the code processor 900 of FIG. 9). The example method 1200 of FIG. 12 begins when the receiver 902 receives an infrared signal from a device (e.g., the remote control 806 of FIG. 8) representative of a command (e.g., volume up, volume down, mute, etc.) input by a user (block 1202). The decoder 904 decodes the received infrared signal into a code associated with the command entered by the user at the device (block 1204). The device code identifier 906 determines if the entered command code is recognized (block 1206). The device code identifier 906 obtains the entered command code from the decoder 904 and searches for the entered command code in the device database 908. The device database 908 stores commands and command codes for particular controllers. If the entered command code is found in the device database 908, the command processor 910 executes the command returned to the device code identifier 906 (block 1208). If the command is found and executed, the example method 1200 ends.

If the entered command code is not found in the device database 908 by the device code identifier 906, the device messenger 912 sends a query message to a playback system (e.g., the playback system 816 of FIG. 8) with the entered command code (block 1210). The playback system searches a code database for the entered command code in a manner similar to that performed by the device identifier 906 to search the device database 908 and sends a response message to the device messenger 912 based on the results of the search. The device messenger 912 receives the response message from the playback system (block 1212). The device code identifier determines if the entered command code was recognized by the playback system based on the response message (block 1214). If the playback system recognized the entered command code, the playback system sends the response message to the device messenger 912 with the command associated with the entered command code. The response message received by the device messenger 912 also includes other commands and command codes associated with the particular remote control. The device code identifier 906 obtains the received commands and command codes from the device messenger 912 and stores the commands and command codes in the device database 908 for later command identification (block 1216). In addition to storing the commands and command codes, the device code identifier 906 may send the identified command associated with the entered command code to the command processor 910 for command execution.

If the playback system searches the code database for the entered command code and does not find the entered command code, the playback system sends the response message to the device messenger 912 indicating the entered command code was not found. If the entered command code was not found by the device code identifier 906 in the device database 908 or by the playback system, the device code identifier 906 implements a learning process to learn commands associated with the particular controller being used to control the audio playback device.

To implement the learning process, the device code identifier 906 prompts a user to input a particular command via the prompter 914 (block 1218). For example, the device code identifier 906 may use the prompter 914 to prompt the user to enter "volume up" on the remote control. Once the user inputs the particular command on the controller, the receiver 902 receives an infrared signal representative of the command (block 1220) and the decoder 904 decodes the infrared signal (block 1222). The device code identifier 906 obtains the decoded command code from the decoder 904 and stores the command code with the associated command in the device database 908 (block 1224). The prompter 914 may also be used by the device code identifier 906 to provide a confirmation to the user that the prompted command was received and identified.

The device code identifier 906 determines if there is another input to learn (block 1226). For example, the device code identifier 906 may prompt the user to enter the particular command multiple times to increase the likelihood of storing the correct command code with the particular command and/or may repeat the learning process for a variety of common commands. If there is another input to learn, control returns to block 1218 and the device code identifier 906 prompts the user to input a particular command via the prompter 914.

Once the device code identifier 906 has implemented the learning process for the variety of common commands, the device messenger 912 sends a message to the playback system with the learned commands and command codes (block 1228). The playback system may store and/or distribute these learned commands to other audio playback devices to increase the likelihood of command identification at each of the audio playback devices. The example method 1200 of FIG. 12 then ends.

Figure 13:
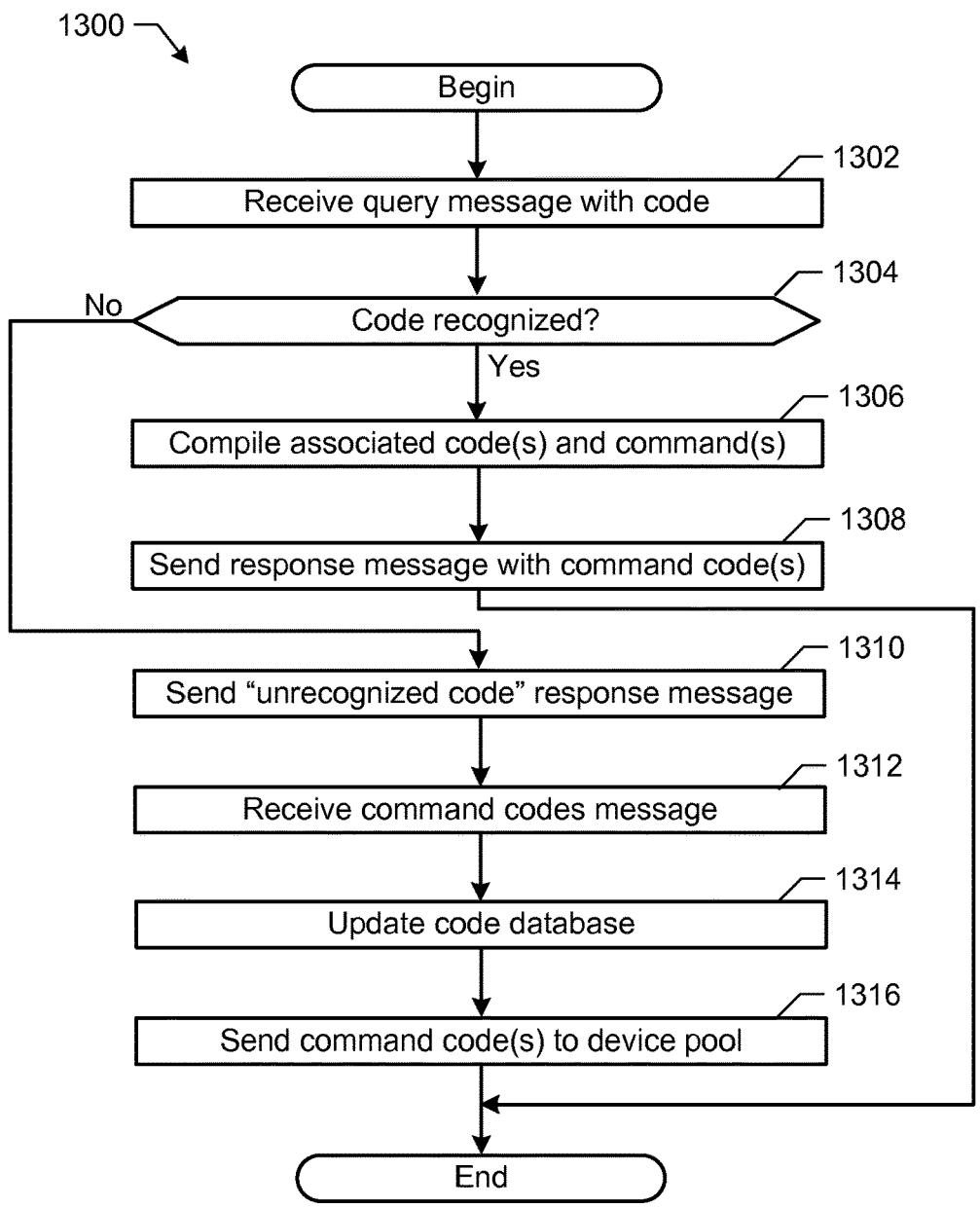
FIG. 13 shows another flowchart representative of another example method to process a code command.

FIG. 13 shows a flowchart representative of a more detailed example method 1300 to process a code command at a system processor (e.g., the system processor 1000 of FIG. 10). The example method 1300 of FIG. 13 begins when the system messenger 1002 receives a message from an audio playback device (e.g., the audio playback device 802 of FIG. 8) that includes an entered command code (e.g., a code representative of a command entered by a user on a remote control) (block 1302). To assist the audio playback device in identifying the command associated with the entered command code, the system code identifier 1004 determines if the entered command code is recognized (block 1304). The system code identifier 1004 searches the system database 1006 for the entered command code. The system database 1006 stores commands and command codes for particular controllers. If the system code identifier 1004 finds the entered command code in the system database 1006 (block 1304), the system code identifier 1004 compiles the commands and command codes associated with the particular controller (block 1306) and the system messenger 1002 sends a response message to the audio playback device with the commands and command codes associated with the particular remote control (block 1308). For example, the entered command code may be associated with the command "volume up," but the response message will include the command codes for "volume up," "volume down," "mute," "play," and "pause" for the particular remote control. The audio playback device may store the commands and command codes for later command identification. Once the response message with the commands and command codes is sent, the example method 1300 ends.

If the system code identifier 1004 searches the system database 1006 for the entered command code and does not find the entered command code (block 1304), the system messenger 1002 sends a response message to the audio playback device indicating the entered command code was not recognized (block 1310). If the entered command code was not found by the system processor 1000 (or locally), the audio playback device may implement a learning process to learn commands associated with the particular controller. Once the audio playback device has implemented the learning process for a variety of common commands, the audio playback device sends a message to the system processor 1000 with the learned commands and command codes. The system messenger 1002 receives the message with the learned commands and command codes (block 1312) and the system code identifier 1004 stores the learned commands and command codes in the system database 1006 (block 1314). The system messenger 1002 sends a message to the pool of audio playback devices (e.g., the plurality of playback devices subscribed to the playback system) that includes the learned commands and command codes (block 1316). Each audio playback device may store the learned commands and command codes locally to facilitate more efficient identification of commands at each audio playback device. Once the learned commands and command codes have been shared with the pool of playback devices, the example method 1300 ends.

VIII. Conclusion

In view of the foregoing, it should be apparent that the disclosed example methods and apparatus can be used to allow a playback device to learn commands associated with a particular controller and share those commands among a network of playback devices. In some examples, the playback device may learn controller commands for the variety of controllers so that the variety of controllers may be used to control the playback device without requiring an extensive or exhaustive set-up process for the user. In some examples, a user may initially enter a single command on a controller (e.g., the user may select or depress a volume up button on the remote) and the playback device recognizes the single command. In such examples, after recognizing the single command, the playback device obtains other commands associated with the controller (e.g., with the same code format, encoding, etc.) and stores the commands for later recognition. Thus, the playback device may learn all commands associated with remote based on only a single button push by the user.

In some examples, commands recognized at a playback device are shared with other playback devices via a shared resource, such as a cloud database. Such a method of command sharing increases the likelihood that a particular playback device will recognize a particular format or encoding used by a controller.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A playback device comprising:
   one or more processors; and
   tangible, non-transitory computer-readable memory comprising instructions encoded thereon, wherein the instructions, when executed, cause the playback device to perform a method comprising:
   receiving a first set of one or more codes corresponding to a first set of one or more commands from a remote control;
   determining that the first set of one or more codes is one of (i) not recognized or (ii) recognized; and
   in response to determining that the received first set of one or more codes is not recognized, performing learning functions comprising:
   prompting a user to enter a second set of one or more commands via the remote control, wherein the second set of one or more commands is different than the first set of one or more commands;
   receiving a second set of one or more codes, wherein each code corresponds to one command of the second set of one or more commands;
   in the tangible, non-transitory, computer-readable memory, storing (i) the first set of one or more codes and the corresponding first set of one or more commands and (ii) the second set of one or more codes corresponding to the second set of one or more commands; and
   causing a code database separate from the playback device to store (i) the first set of one or more codes and the corresponding first set of one or more commands and (ii) the second set of one or more codes corresponding to the second set of one or more commands.

2. The playback device of claim 1, wherein the method further comprises, after storing the first set of one or more codes corresponding to the first set of one or more commands in the tangible, non-transitory computer-readable memory of the playback device:
   configuring the playback device to (i) execute each of the first set of one or more commands in response to receiving each of the first set of one or more corresponding codes from the remote control and (ii) execute each of the second set of one or more commands in response to receiving each of the second set of one or more corresponding codes from the remote control.

3. The playback device of claim 1, wherein prompting the user to enter the second set of one or more commands via the remote control comprises prompting the user via audio instructions played via the playback device.

4. The playback device of claim 1, wherein prompting the user to enter the second set of one or more commands via the remote control comprises prompting the user via visual instructions.

5. The playback device of claim 1, wherein the first set of one or more commands comprises one or more of a volume up, volume down, mute, power on, and power off command.

6. The playback device of claim 1, wherein the method further comprises:
   transmitting, to another playback device, (i) the first set of one or more codes and the corresponding first set of one or more commands and (ii) the second set of one or more codes corresponding to the second set of one or more commands.

7. The playback device of claim 1, wherein the remote control comprises an infrared transmitter and wherein receiving the first set of one or more codes corresponding to a first set of one or more commands from the remote control comprises receiving the first set of one or more codes via an infrared transmission.

8. The playback device of claim 1, wherein the remote control comprises a Bluetooth transmitter and wherein receiving the first set of one or more codes corresponding to a first set of one or more commands from the remote control comprises receiving the first set of one or more codes via a Bluetooth transmission.

9. Tangible, non-transitory computer-readable media comprising instructions encoded thereon, wherein the instructions, when executed, cause a playback device to perform a method comprising:
   receiving a first set of one or more codes corresponding to a first set of one or more commands from a remote control;
   determining that the first set of one or more codes is one of (i) not recognized or (ii) recognized; and
   in response to determining that the received first set of one or more codes is not recognized, performing learning functions comprising:
   prompting a user to enter a second set of one or more commands via the remote control, wherein the second set of one or more commands is different than the first set of one or more commands;
   receiving a second set of one or more codes, wherein each code corresponds to one command of the second set of one or more commands;
   in a local memory, storing (i) the first set of one or more codes and the corresponding first set of one or more commands and (ii) the second set of one or more codes corresponding to the second set of one or more commands; and
   causing a code database separate from the playback device to store (i) the first set of one or more codes and the corresponding first set of one or more commands and (ii) the second set of one or more codes corresponding to the second set of one or more commands.

10. The tangible, non-transitory computer-readable media of claim 9, wherein the method further comprises, after storing the first set of one or more codes corresponding to the first set of one or more commands in the tangible, non-transitory computer-readable memory of the playback device:
    configuring the playback device to (i) execute each of the first set of one or more commands in response to receiving each of the first set of one or more corresponding codes from the remote control and (ii)

execute each of the second set of one or more commands in response to receiving each of the second set of one or more corresponding codes from the remote control.

11. The tangible, non-transitory computer-readable media of claim 9, wherein prompting the user to enter the second set of one or more commands via the remote control comprises prompting the user via audio instructions played via the playback device.

12. The tangible, non-transitory computer-readable media of claim 9, wherein prompting the user to enter the second set of one or more commands via the remote control comprises prompting the user via visual instructions.

13. The tangible, non-transitory computer-readable media of claim 9, wherein the first set of one or more commands comprises one or more of a volume up, volume down, mute, power on, and power off command.

14. The tangible, non-transitory computer-readable media of claim 9, wherein the method further comprises:
transmitting, to another playback device, (i) the first set of one or more codes and the corresponding first set of one or more commands and (ii) the second set of one or more codes corresponding to the second set of one or more commands.

15. The tangible, non-transitory computer-readable media of claim 9, wherein the remote control comprises an infrared transmitter and wherein receiving the first set of one or more codes corresponding to a first set of one or more commands from the remote control comprises receiving the first set of one or more codes via an infrared transmission.

16. The tangible, non-transitory computer-readable media of claim 9, wherein the remote control comprises a Bluetooth transmitter and wherein receiving the first set of one or more codes corresponding to a first set of one or more commands from the remote control comprises receiving the first set of one or more codes via a Bluetooth transmission.

17. A method comprising:
a playback device receiving a first set of one or more codes corresponding to a first set of one or more commands from a remote control;
the playback device determining that the first set of one or more codes is one of (i) not recognized or (ii) recognized; and
in response to determining that the received first set of one or more codes is not recognized, the playback device performing learning functions comprising:
prompting a user to enter a second set of one or more commands via the remote control, wherein the second set of one or more commands is different than the first set of one or more commands;
receiving a second set of one or more codes, wherein each code corresponds to one command of the second set of one or more commands;
in a local memory at the playback device, storing (i) the first set of one or more codes and the corresponding first set of one or more commands and (ii) the second set of one or more codes corresponding to the second set of one or more commands; and
causing a code database separate from the playback device to store (i) the first set of one or more codes and the corresponding first set of one or more commands and (ii) the second set of one or more codes corresponding to the second set of one or more commands.

18. The method of claim 17 further comprising, after storing the first set of one or more codes corresponding to the first set of one or more commands in local memory at the playback device:
configuring the playback device to (i) execute each of the first set of one or more commands in response to receiving each of the first set of one or more corresponding codes from the remote control and (ii) execute each of the second set of one or more commands in response to receiving each of the second set of one or more corresponding codes from the remote control.

19. The method of claim 17, wherein prompting the user to enter the second set of one or more commands via the remote control comprises at least one of (i) prompting the user via audio instructions played via the playback device or (ii) prompting the user via visual instructions.

20. The method of claim 17, further comprising:
transmitting, to another playback device, (i) the first set of one or more codes and the corresponding first set of one or more commands and (ii) the second set of one or more codes corresponding to the second set of one or more commands.

* * * * *